L. D. SMITH.
GRAIN TREATING APPARATUS.
APPLICATION FILED MAR. 24, 1917.
1,313,027.
Patented Aug. 12, 1919.
2 SHEETS—SHEET 1.
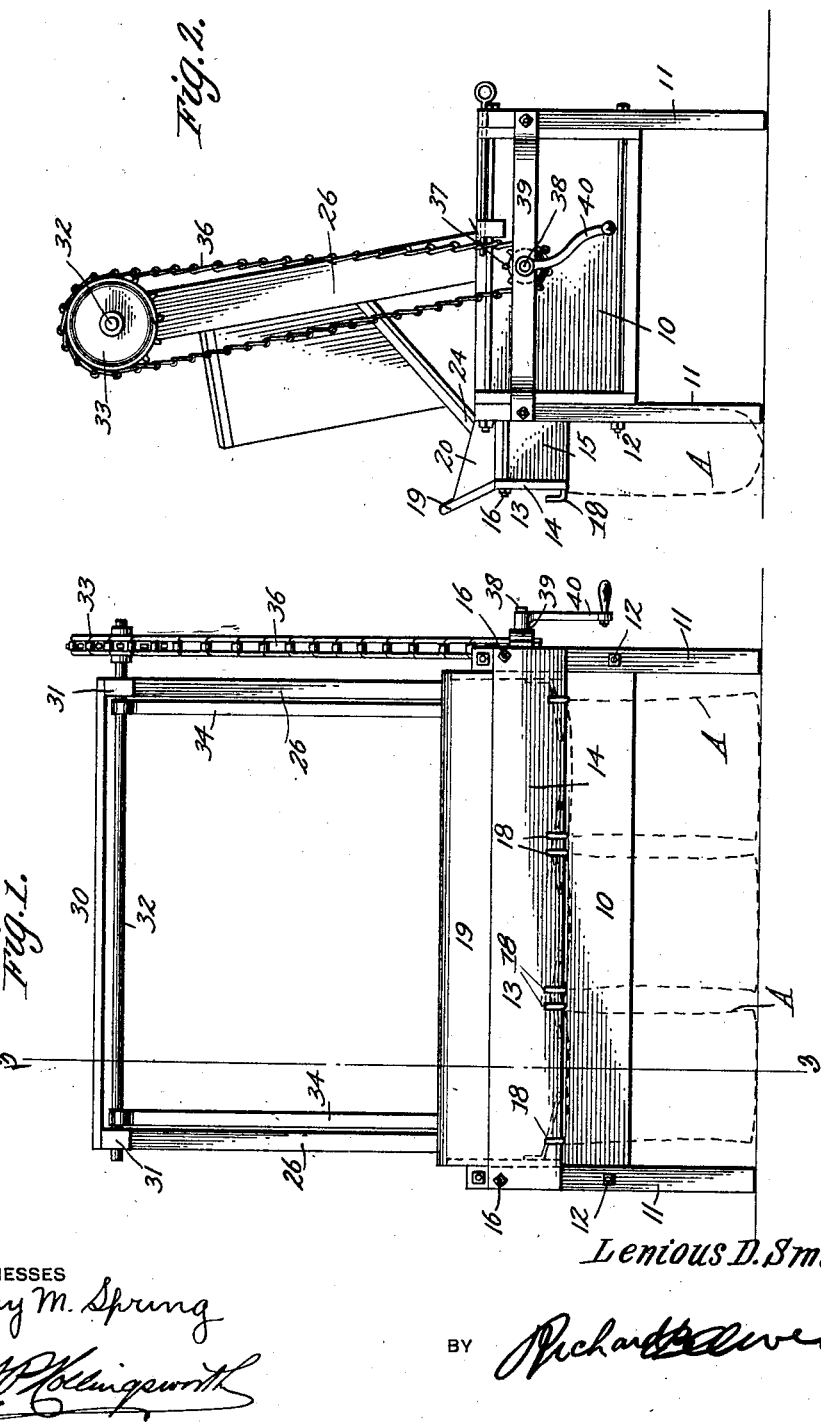
WITNESSES
INVENTOR
Lenious D. Smith
BY
ATTORNEY

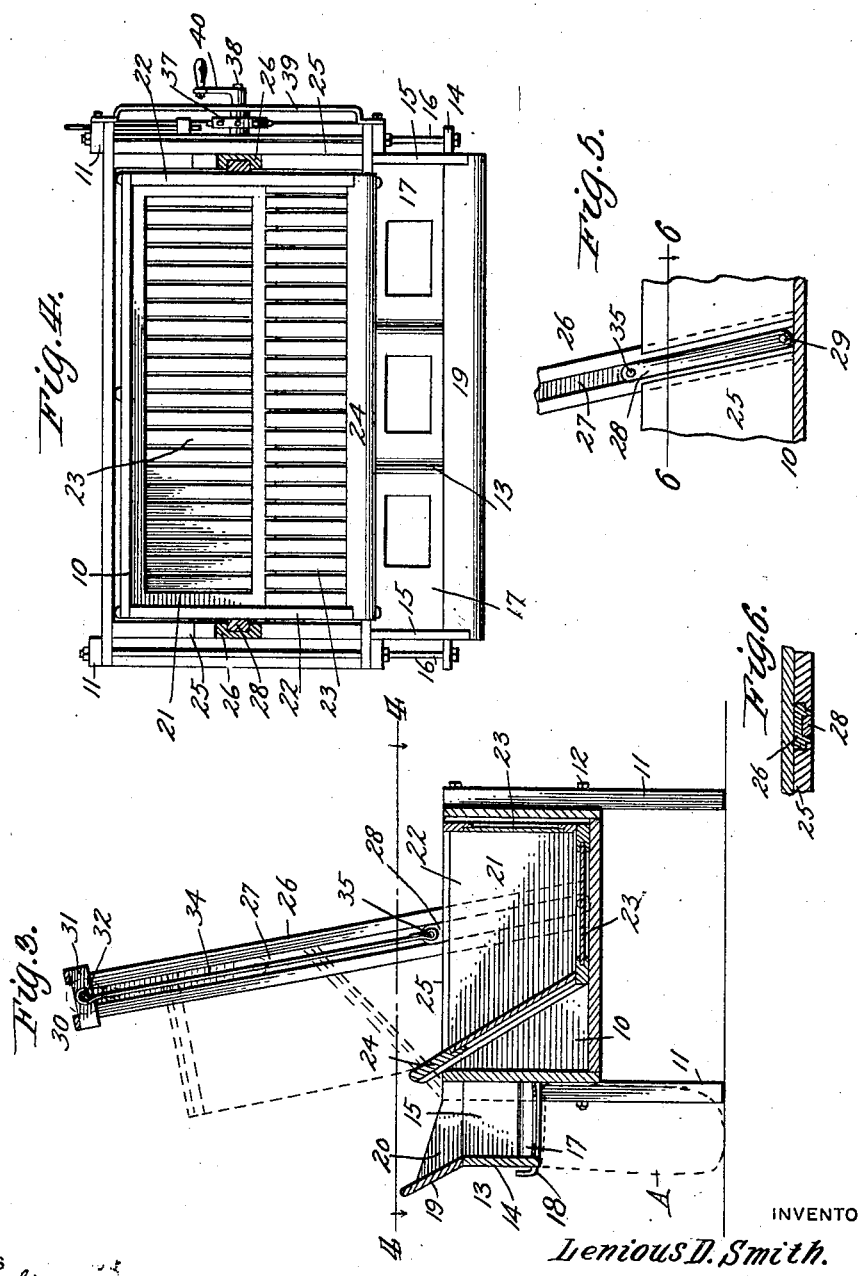

UNITED STATES PATENT OFFICE.

LENIOUS D. SMITH, OF HELIX, OREGON.

GRAIN-TREATING APPARATUS.

1,313,027.  Specification of Letters Patent.  Patented Aug. 12, 1919.

Application filed March 24, 1917. Serial No. 157,191.

*To all whom it may concern:*

Be it known that I, LENIOUS D. SMITH, a citizen of the United States, residing at Helix, in the county of Umatilla and State of Oregon, have invented certain new and useful Improvements in Grain-Treating Apparatus, of which the following is a specification.

This invention relates to an apparatus for treating grain and other seed and particularly the seeds that are affected with smut, a fungus growth that is destructive to the crop; the particular object of the invention being to provide an apparatus for treating the grain with a preparation that will destroy smut without affecting the grain itself in the least. Furthermore, the invention is also designed to treat the grain in bulk, and after treatment to deliver the grain into sacks to facilitate the transportation thereof and render the operation of handling grain more convenient and expeditious.

With the above as the principal object in view the invention consists in the novel construction, combination and arrangement of parts hereinafter described, pointed out in the appended claims, and illustrated in the accompanying drawings, in which—

Figure 1 is an elevation of the complete apparatus as seen from the front side thereof, Fig. 2 is an end elevation as viewed from the right of Fig. 1, Fig. 3 is a vertical transverse sectional view on the line 3—3 of Fig. 1, Fig. 4 is a horizontal sectional view on the line 4—4 of Fig. 3, looking in the direction of the arrows, Figs. 5 and 6 are detail views of certain features of construction.

In the drawings, 10 indicates a water-tight trough preferably rectangular in shape and of any size desired, the most convenient sizes for general use being designed for the treatment of from three to five bags of grain at one time. The trough 10 is elevated to a convenient height by legs 11 at the several corners thereof bolted to the trough as shown at 12.

Projecting from the front side of the trough 10 is a hopper 13, the front side wall 14 of which extends from end to end of the trough and about half way down from the top, this being spaced from the trough by side members 15 and the whole fastened to the trough by bolts 16. The top of the hopper is open, the under side, however, being closed by three or more shallow, funnel-like bottoms 17 having openings through their centers for the passage of grain, these bottoms being so shaped as to deliver the grain from the hopper into three or more bags A suspended from hooks 18 secured on the front of the hopper 13 and the trough 10 below the hopper. To prevent the grain being emptied into the hopper from spilling over the top of the front wall 14, a second wall 19 is placed above the same and inclined outwardly as shown, side members 20 extending from the wall 19 rearwardly to the trough 10.

Within the trough 10 is a removable grain receptacle 21 having vertical ends and rear side and an inclined front, thereby making the receptacle wider at the top than at the bottom as clearly shown in Fig. 3. The ends 22 of the receptacle are preferably, though not necessarily, made solid. The bottom, rear, and front, however, are framed as shown, and then covered with slats 23, spaced a short distance apart, as shown in Fig. 4 to permit liquid in the trough 10 to enter the receptacle but prevent the passage therethrough of the grain. The front 24 of the receptacle extends a short distance above the body of the hopper to form a guide and in a measure a spout for the discharge of grain from the receptacle into the hopper 13.

Each end 25 of the trough 10 is grooved or rabbeted on its inner face at substantially the center thereof to receive an upright or standard 26, each groove being substantially midway between the front and rear walls of the trough and inclined toward the front side thereof at the top for the purpose of maintaining the standards 26 in a forwardly inclined position. Each standard 26 is formed with a longitudinal channel 27 from end to end in which freely slides a link 28, the lower ends of which links are pivotally connected at 29 to the respective ends of the receptacle 22 at the bottom thereof. The upper ends of the standards 26 are connected together by one or more cross bars 30 in any suitable and convenient manner. In the present instance the two cross bars 30 are fastened at their ends to blocks 31, the under sides of which are mortised to receive tenons on the upper ends of the standards 26, thereby permitting ready disassembling of these parts when desired. Extending through the blocks 31 and having a bearing therein is a horizontal shaft 32 on one end of which is keyed a sprocket wheel 33. Within each standard 26 a strap, belt, or other flexible member 34 is secured to the shaft and when the latter is rotated, winds upon the shaft, the lower end of each strap being connected to a pin 35 projecting inwardly from one of the links 28. Rotating the shaft therefore will wind the straps 34 thereon and raising the links 28, will elevate the grain receptacle 22.

Passing about the sprocket wheel 33 is a chain belt 36 that extends downwardly to and about a sprocket pinion 37 carried on a short shaft 38 that has bearings at one end in the side of the trough 10 and at its opposite end in a horizontal strap or brace 39 extending across the end of the trough and bolted to the legs 11. This end of the shaft projecting a short distance beyond the brace 39 is fitted with a hand crank 40 for winding the straps 34 on the shaft 32.

In using this apparatus, a suitable quantity of sulfate of copper, commonly known as blue vitriol, in solution in water of the proper strength is placed in the trough 10 and grain emptied from the bags into the receptacle 22. The solution is sufficient to fully submerge the grain and its action on any smut that may have attacked the grain will be destructive to the smut. After the lapse of sufficient time, the crank 40 is rotated to turn the shaft 32 and wind the straps 34 thereon, thereby drawing the receptacle 21 into the position shown in Fig. 2. The links 28 sliding to the top of the standard 26 will lift the bottom of the receptacle, and owing to the support given the front 24 thereof, the latter will swing about the front of the trough as on a pivot and pour the grain into the hopper 13. The bags A which have been hung upon the hooks 18 below the funnel-shaped bottoms 17 are in position to receive the grain which will be equally divided between the several bags and the latter can be immediately removed to make room for other empty bags when the next charge of grain has been poured into the receptacle 22. The upward movement of the receptacle will not be rapid and thus sufficient time will be afforded the solution within the receptacle to drain from the grain into the trough 10 and when the receptacle has been emptied and returned to the trough, it is again ready for another batch of grain to be treated.

What I claim is:

In an apparatus for treating grain and other seeds, the combination with a box-like trough open at its top, a hopper secured to the front of the trough; of parallel forwardly inclined standards rising rigidly from the ends of said trough and provided with guides, slides movable in the latter, a windlass across the upper ends of said standards having ropes connected with said slides, and a receptacle shaped to fit within the ends and rear side and bottom of said trough and having its ends pivoted to the lower ends of said slides, its front inclining upward and forward and over the front wall of said trough and overlying said hopper, for the purposes set forth.

In testimony whereof I affix my signature in presence of two witnesses.

LENIOUS D. SMITH.

Witnesses:
THEODORE NORVELL,
CHAS. C. MITCHELL.

Copies of this patent may be obtained for five cents each, by addressing the 'Commissioner of Patents, Washington, D. C."